W. A. CARVER.
FOUNTAIN FEED ROTARY BRUSH.
APPLICATION FILED MAY 1, 1918.

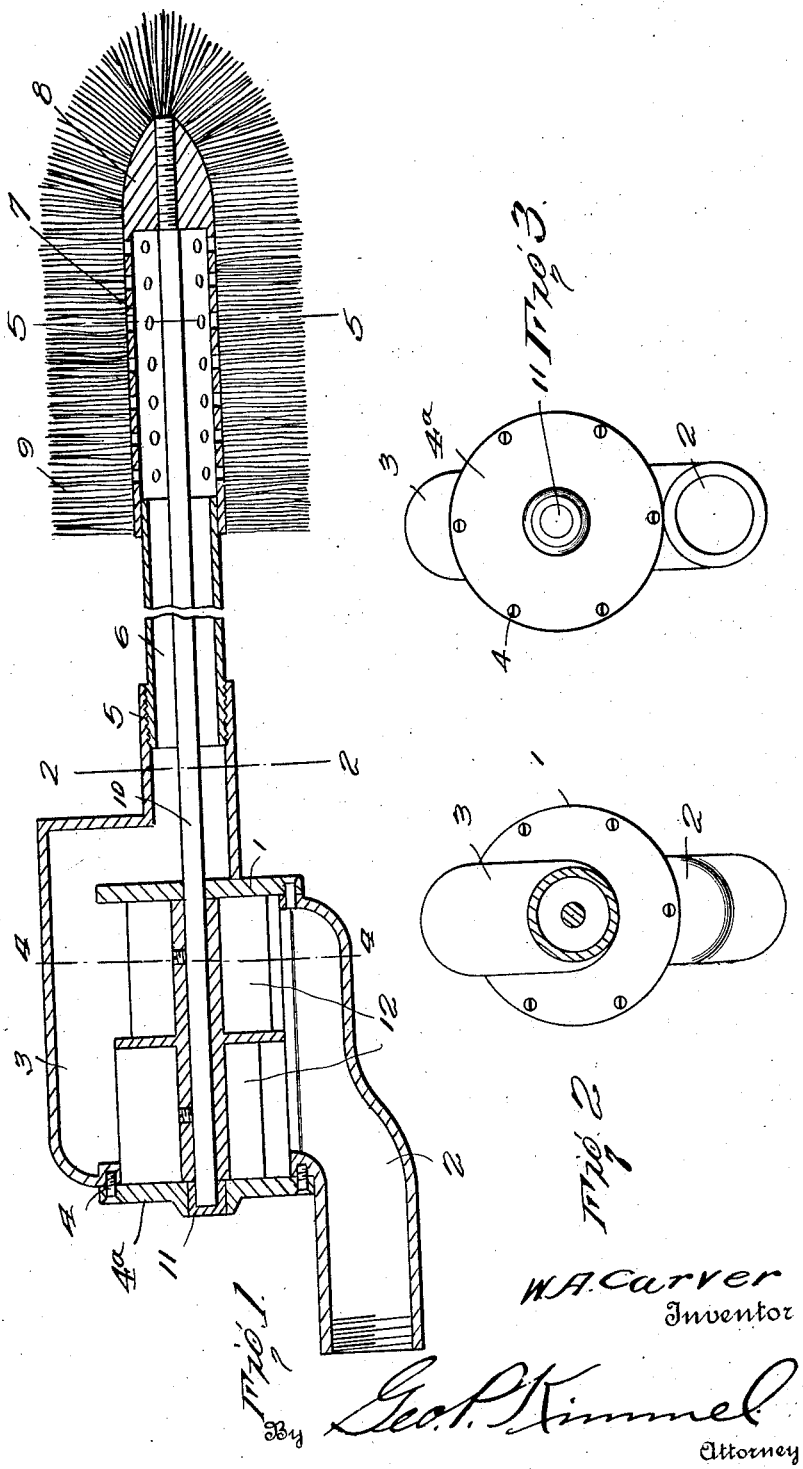

1,393,663.

Patented Oct. 11, 1921.
2 SHEETS—SHEET 2.

W. A. Carver
Inventor

By Geo. P. Kimmel
Attorney

UNITED STATES PATENT OFFICE.

WILFRED A. CARVER, OF BUFFALO, NEW YORK.

FOUNTAIN-FEED ROTARY BRUSH.

1,393,663.

Specification of Letters Patent. Patented Oct. 11, 1921.

Application filed May 1, 1918. Serial No. 231,854.

*To all whom it may concern:*

Be it known that I, WILFRED A. CARVER, a citizen of the United States, residing at Buffalo, in the county of Erie and State of New York, have invented certain new and useful Improvements in a Fountain-Feed Rotary Brush, of which the following is a specification.

This invention relates to improvements in fountain feed brushes, and it is the principal object of the invention to provide a novel form of fountain feed rotary brush especially desirable for use in the washing of vehicles whereby all confined and limited spaces occurring thereon can be readily reached and subjected to the rubbing and cleansing action of the brush, thus eliminating considerable labor and loss of time upon part of the user.

It is a more specific object of the invention to provide a brush of the character mentioned having water actuated means for imparting rotary motion thereto, the force of the flow of water by same being such as to cause rotation of the brush at a high velocity.

The foregoing together with additional advantageous details and arrangements of parts of the preferred embodiment of my invention will be clear from the specific description hereinafter contained, when read in connection with the accompanying drawings forming a part thereof, wherein said embodiment of the invention is illustrated for the purpose of facilitating a full understanding of the present improvements.

In the drawings:

Figure 1 is a vertical longitudinal section through the improved brush,

Fig. 2 is a transverse section therethrough taken on the line 2—2 of Fig. 1,

Fig. 3 is an end elevation,

Figure 4:
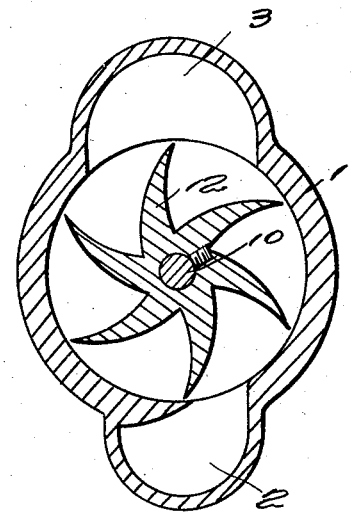
Fig. 4 is a transverse section taken on the line 4—4 of Fig. 1.
Figure 5:
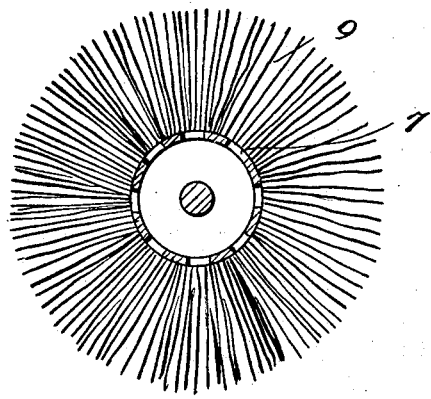
Fig. 5 is a similar section taken on the line 5—5 of Fig. 1.

Having more particular reference to the drawings, in connection with which like reference characters will designate corresponding parts throughout the several views, 1 represents the casing of the improved brush, the same being substantially cylindrical in form and having water inlet and outlet conduits connected thereto, the inlet conduit 2, obviously, being adapted for engagement with a hose or other suitable source of water supply while the outer extremity of the outlet conduit 3 is internally screw threaded as at 5 and engaged with a short conduit 6. A removable end plate 4ª is secured to the open end of the casing by bolts 4. In this connection, it is to be noted that a portion of outlet conduit is offset in order to permit passage of water into the conduit 6.

Rotatably mounted on the outer end of the short conduit 6 is a perforate sleeve 7 having its outer end substantially closed by an internally screw threaded head 8 and carrying a suitable form of brush 9 thereon.

Extended longitudinally through the casing, the outlet conduit 3, the short conduit 6, and the perforate sleeve 7, is a driving shaft 10, one end of which is screw threaded and adapted for reception in the screw threaded head 8 while the remaining end is rotatably mounted in a bearing pocket 11 carried by the rear wall of the casing 1. Secured to that portion of the shaft 10 which passes through the casing 1 are rotary turbines 12, the same being secured in position with relation to the shaft 10 by means of set screws, or like fastening devices, which are passed therethrough into engagement with said shaft. Obviously, these turbines have their various radially disposed vanes arranged in the course of travel of the water through the casing 1 and as a consequence the force of the flow thereof will be sufficient to impart rotary motion to the same which in turn will be transmitted by way of the driving shaft 10 to the brush 9, thus, rotating the same at a high speed.

As hereinbefore stated, the flow of water by the turbines 12 will impart rotary motion thereto and consequently to the brush 9, while the water will continue on through the casing and from the same into the perforate sleeve 7 from where it will be discharged through the brush bristles on to the object being washed or cleansed therewith. By reason of the high velocity at which the brush is rotating, all matter will be thoroughly removed from an object being washed thereby without the liability of marring or scratching the surface or finish of the same. Further, since the brush 9 is rotating, the device can be effectually used in connection with the confined or limited spaces occurring in the running gear of a vehicle, hence, enabling a user to thoroughly wash the same.

From the foregoing, it will be readily understood by persons skilled in the art that I have provided an exceedingly practical and simple rotary fountain feed brush and one which, by reason of the mode of assembling, can be readily taken apart to permit of the repairing of portions thereof or the replacing of parts as it may become necessary.

Manifestly, the construction shown is capable of considerable modification, and such modification as is within the scope of my claim I consider within the spirit of my invention.

I claim:

In a device of the class described comprising a casing, a driven shaft rotatably mounted at one end in said casing, a perforated brush, a solid head integral with said brush carried on the opposite end of said shaft to prevent the egress of water adjacent the terminal of said shaft and cause spraying of the water through the side of the brush, means carried by the shaft within the casing for rotating the brush and a removable, circular partition extending into the casing supporting said shaft and serving to direct the flow of water on said means to positively rotate the shaft and said brush.

In testimony whereof, I affix my signature hereto.

WILFRED A. CARVER.